US010733432B2

(12) United States Patent
Pratten et al.

(10) Patent No.: US 10,733,432 B2
(45) Date of Patent: Aug. 4, 2020

(54) RECYCLING VALUE INSTRUMENTS IN AN AUTOMATED TELLER MACHINE

(71) Applicant: The Toronto-Dominion Bank, Toronto (CA)

(72) Inventors: A Warren Pratten, London (CA); Randall Walton Martin, Oakville (CA); Martin Albert Lozon, London (CA); Graham Allan Anderson, Guelph (CA); Ratnadeep Bhadra, Oakville (CA); James Kenneth McCrae, Guelph (CA); Dino Paul D'Agostino, Richmond Hill (CA)

(73) Assignee: The Toronto-Dominion Bank, Toronto, Ontario (CA)

( * ) Notice: Subject to any disclaimer, the term of this patent is extended or adjusted under 35 U.S.C. 154(b) by 127 days.

(21) Appl. No.: 16/139,287

(22) Filed: Sep. 24, 2018

(65) Prior Publication Data

US 2020/0097710 A1    Mar. 26, 2020

(51) Int. Cl.
| G06K 9/00 | (2006.01) |
| G07F 19/00 | (2006.01) |
| G06K 9/78 | (2006.01) |
| G07D 11/30 | (2019.01) |

(52) U.S. Cl.
CPC ..... *G06K 9/00442* (2013.01); *G06K 9/00577* (2013.01); *G06K 9/78* (2013.01); *G07D 11/30* (2019.01); *G07F 19/202* (2013.01)

(58) Field of Classification Search
CPC .......................... G06K 9/00442; G07F 19/202
See application file for complete search history.

(56) References Cited

U.S. PATENT DOCUMENTS

| 7,401,730 B2 | 7/2008 | He et al. |
| 7,513,417 B2 | 4/2009 | Burns et al. |
| 8,047,427 B2 | 11/2011 | Sanders et al. |
| 9,195,889 B2 | 11/2015 | Klein et al. |
| 9,934,497 B2 * | 4/2018 | Crist ..................... G07F 19/203 |
| 2011/0130867 A1 * | 6/2011 | Matsumoto ............ G07D 11/20 700/216 |

FOREIGN PATENT DOCUMENTS

| CN | 103914905 A | 7/2014 |
| WO | 2014181138 A1 | 11/2014 |

\* cited by examiner

*Primary Examiner* — King Y Poon
*Assistant Examiner* — Michael Burleson
(74) *Attorney, Agent, or Firm* — Rowand LLP

(57) ABSTRACT

A computer system for recycling value instruments in an automated teller machine has a memory storing instructions that, when executed by a processor, cause the system to receive an image of a value instrument obtained by an automated teller machine for deposit. The image of the value instrument is analyzed to determine its condition. Then, based on the condition of the value instrument, it may be determined that the value instrument is suitable for recycling to fulfill withdrawals. Upon determining that the value instrument is suitable for recycling to fulfill withdrawals, recycling of the value instrument by the automated teller machine is initiated and an indication reflecting the recycling is generated so as to influence when a next servicing of the automated teller machine will occur. Related methods and computer-readable media are also disclosed.

20 Claims, 8 Drawing Sheets ered States Patent

RECYCLING VALUE INSTRUMENTS IN AN AUTOMATED TELLER MACHINE

FIELD

The present application relates to handling value instruments received for deposit in automated teller machines (ATMs) and, more particularly, to selective recycling of value instruments received by ATMs for use in servicing subsequent withdrawals.

BACKGROUND

Automated teller machines (ATMs) or automated banking machines (ABMs) allow certain banking activities to be performed without resort to a human teller. For example, withdrawals can be made and fulfilled by value instruments (in many cases, banknotes) dispensed by the machine. In another example, deposits can be made with value instruments inserted into the machine.

Deposits are made up of one or more value instruments. In most existing ATMs, value instruments making up deposits are packaged by the depositor into an envelope and are then inserted into the ATM using an envelope. These envelopes are then retained by the ATM and the amount of each deposit is verified after the ATM is serviced and the envelopes are opened.

More recently, some so-called "envelope-free" ATMs allow value instruments to be received by an ATM without using an envelope. Such ATMs may include a scanner that captures images of value instruments received by the ATM. This may facilitate technologies such as image-based cheque clearing (sometimes referred to as "cheque truncation") which can allow the handling of the physical cheque in the cheque clearing process to be replaced with electronic transfers of images.

When the cassette(s) from which cash is dispensed to fulfill withdrawals are low or empty, the ATM must be serviced. For example, an armored car service may visit the ATM to refill those cassettes. An ATM may also require servicing if a deposit cassette used to retain deposit items has become full. Indeed, servicing may also involve picking up value instruments retained from deposits.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
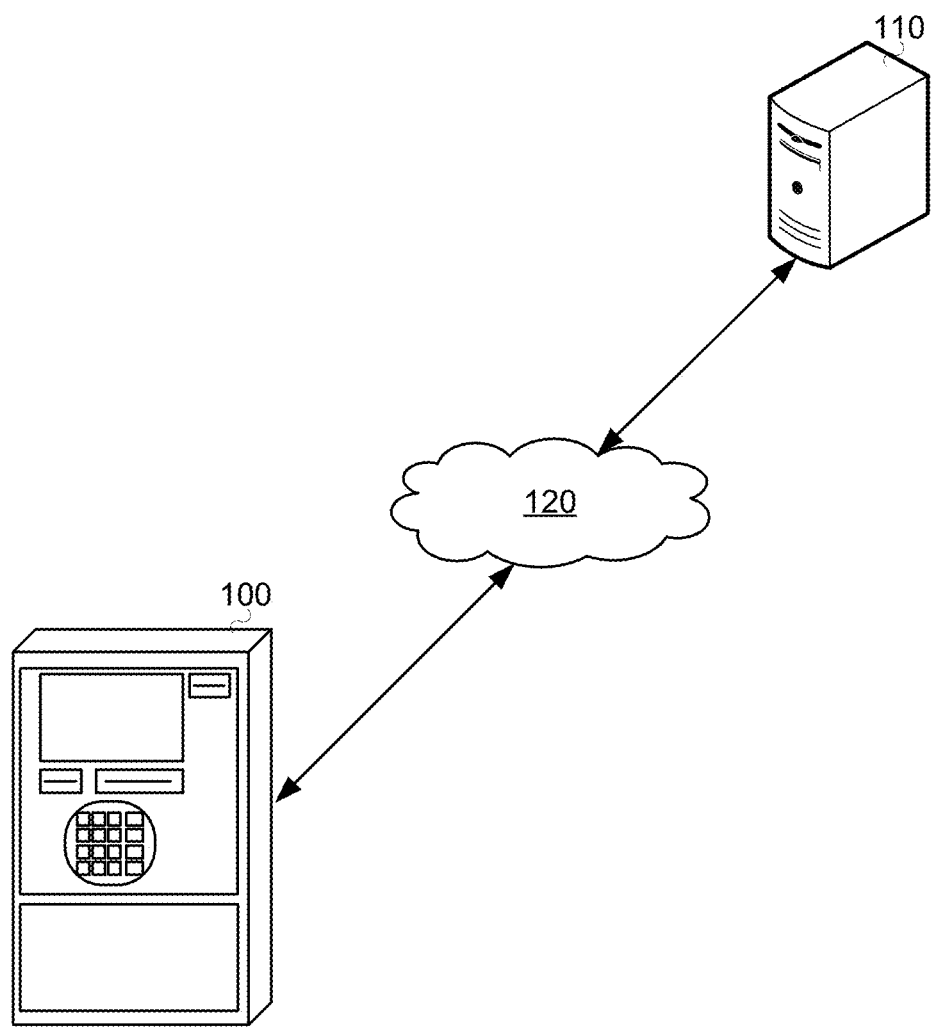
FIG. 1 is a schematic operation diagram illustrating an operating environment of an example embodiment.

According to the subject matter of the present application, there may be provided a computer-implemented method. The method may include receiving an image of a value instrument obtained by an automated teller machine for deposit. The image of the value instrument may be analyzed to determine a condition of the value instrument. Based on the condition of the value instrument, it may be determined whether the value instrument is suitable for recycling to fulfill withdrawals. Upon determining that the value instrument is suitable for recycling to fulfill withdrawals, recycling of the value instrument by the automated teller machine may be initiated. Further, it may be that indication reflecting the recycling is generated to influence when a next servicing of the automated teller machine will occur.

In this way, value instruments (e.g., cash) received by the automated teller machine may be recycled for use in servicing subsequent withdrawals. Further, the indication reflecting this recycling may allow influencing of when a next servicing of the automated teller machine will occur. For example, where sufficient value instruments are recycled, servicing (e.g., to replenish the automated teller machine with value instruments) may be deferred.

By contrast in existing ATMs (even "envelope-free" ATMs), if a customer goes to an ATM and withdraws cash, that cash is dispensed from a cassette. Meanwhile, if a different (or the same) customer deposits cash or other value instruments into that same ATM, those value instruments go into a separate cassette that is not used to fulfill withdrawals. Notably, this may mean that servicing of an existing ATM may be required to refill one or more cassettes with value instruments (e.g., banknotes) even while that same ATM has another cassette full of same or similar value instruments from deposits. Conveniently, it may be that an implementation of the subject matter of the present application may avoid or limit such unnecessary servicing.

The value instrument may be a banknote. Alternatively, it may be that the value instrument is a coin.

In some implementations, the method may further include receiving an image of a second value instrument obtained by the automated teller machine for deposit. The image of the second value instrument may be analyzed to determine a condition of the second value instrument. Based on the condition of the second value instrument, it may be determined that the second value instrument is unsuitable for recycling to fulfill withdrawals. Upon determining that the second value instrument is unsuitable for recycling to fulfill withdrawals, retaining of the second value instrument by the automated teller machine for pick-up when the automated teller machine is serviced may be initiated.

In some implementations, determining the condition of the value instrument may include determining a condition score reflective of the condition of the value instrument. It may be that determining that the value instrument is suitable for recycling to fulfill withdrawals includes determining that the condition score is greater than a threshold score.

In some implementations, analyzing the image of the value instrument to determine the condition of the value instrument may include comparing the image of the value instrument to a digital specimen value instrument.

In some implementations, the condition includes a counterfeit status of the value instrument. It may be that analyzing the image of the value instrument to determine the condition of the value instrument includes verifying, using the image, one or more security features of the value instrument.

In some implementations, the indication reflecting the recycling to influence when a next servicing of the automated teller machine will occur may include an indication of a level of recycled value instruments retained in the automated teller machine and the method may further include sending the indication of the level of recycled value instruments retained in the automated teller machine to an automated scheduling component. It may be that the automated scheduling component is configured to schedule servicing of the automated teller machine based on the level of recycled value instruments.

In some implementations, the automated scheduling component is configured to schedule servicing of the automated teller machine by deferring a scheduled service visit where at least a threshold quantity of value instruments has been retained in the automated teller machine for recycling. It may be that the automated scheduling component is further configured to determine a projected level of value instruments in the automated teller machine based on cash withdrawal activity using the automated teller machine and cash deposit activity using the automated teller machine. The automated scheduling component may be further configured to schedule servicing of the automated teller machine based on the projected level of value instruments in the automated teller machine.

In some implementations, the method may further include determining, based on previous deposits by a customer associated with the deposit, whether deposits including value instruments like the value instrument are typical for the customer. Determining that the value instrument is suitable for recycling to fulfill withdrawals may be further based on whether the deposit is typical for the customer.

According to the subject matter of the present application, there may be provided a computer system configured to perform the above-described method. Such a computer system may include a processor and a memory. The memory may be coupled to the processor. The memory may store instructions that, when executed by the computer system, cause the computer system to perform the above described method.

In a particular example, there may be provided a computer system including a processor and a memory. The memory may be coupled to the processor. The memory may store instructions that, when executed by the computer system, cause the computer system to receive an image of a value instrument obtained by an automated teller machine for deposit; analyze the image of the value instrument to determine a condition of the value instrument; determine, based on the condition of the value instrument, that the value instrument is suitable for recycling to fulfill withdrawals; and upon determining that the value instrument is suitable for recycling to fulfill withdrawals, initiate recycling of the value instrument by the automated teller machine and generate an indication reflecting the recycling to influence when a next servicing of the automated teller machine will occur.

According to the subject matter of the present application, there may be provided a non-transitory computer-readable storage medium storing instructions that, when executed by a processor of a computer system, cause the computer system to perform the above-described method.

In a particular example, there may be provided non-transitory computer-readable storage medium storing instructions that, when executed by a processor of a computer system, cause the computer system to: receive an image of a value instrument obtained by an automated teller machine for deposit; analyze the image of the value instrument to determine a condition of the value instrument; determine, based on the condition of the value instrument, that the value instrument is suitable for recycling to fulfill withdrawals; and upon determining that the value instrument is suitable for recycling to fulfill withdrawals, initiate recycling of the value instrument by the automated teller machine and generate an indication reflecting the recycling to influence when a next servicing of the automated teller machine will occur.

According to the subject matter of the present application, there may be provided an automated teller machine. The automated teller machine may include an item receiver/dispenser, an item scanner, a controller, a display, and one or more cassettes. The automated teller machine may receive, via the item receiver/dispenser, a value instrument for deposit. The automated teller machine may scan the received value instrument using the item scanner to produce a scanned image of the value instrument. The automated teller machine may recycle the value instrument using a recycling one of the one or more cassettes where, based on a condition determined based on an analysis of the scanned image of the value instrument, that the value instrument is suitable for recycling to fulfill withdrawals. It may be that, further to the recycling, an indication reflecting the recycling is generated to influence when a next servicing of the automated teller machine will occur.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, an automated teller machine 100 and a back-office server system 110 communicate via a network 120.

The automated teller machine 100 and the back-office server system 110 may be in geographically disparate locations. Put differently, the automated teller machine 100 may be remote from the back-office server system 110.

As further explained below, the automated teller machine 100 and the back-office server system 110 are computer systems.

The automated teller machine 100 is adapted to provide access to banking services such as, for example, withdrawals and deposits. As further explained below, the automated teller machine 100 is configured to scan (e.g., capture a digital image of) at least some of the value instruments it receives. As such, the automated teller machine 100 may be an "envelope-free" automated teller machine.

The back-office server system 110 is a server that provides one or more back-office services to a financial institution including, for example, maintenance of accounts, payment processing, fraud detection and the like. The back-office server system 110 may, for example, be a mainframe computer, a minicomputer, or the like. In some embodiments, the back-office server system 110 may be formed of or may include one or more computing devices. For example, the back-office server system 110 may include and/or may communicate with multiple computing devices such as, for example, database servers, compute servers, and the like. Multiple computing devices such as these may be in communication using a computer network. For example, such computing devices may communicate using a local-area network (LAN). In some embodiments, the back-office server system 110 may include multiple computing devices organized in a tiered arrangement. For example, the back-office server system 110 may include middle tier and back-end computing devices. In some embodiments, the back-office server system 110 may be a cluster formed of a plurality of interoperating computing devices.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, and/or the like. Additionally or alternatively, one or more devices may communicate with the computer network by way of a plain-old telephone service (POTS) line such as using a modem. In a particular example, the automated teller machine 100 may communicate with the back-office server system 110, directly or indirectly, by way of a POTS line.

Example components of the automated teller machine 100 will now be described with reference to FIG. 2.

Figure 2:
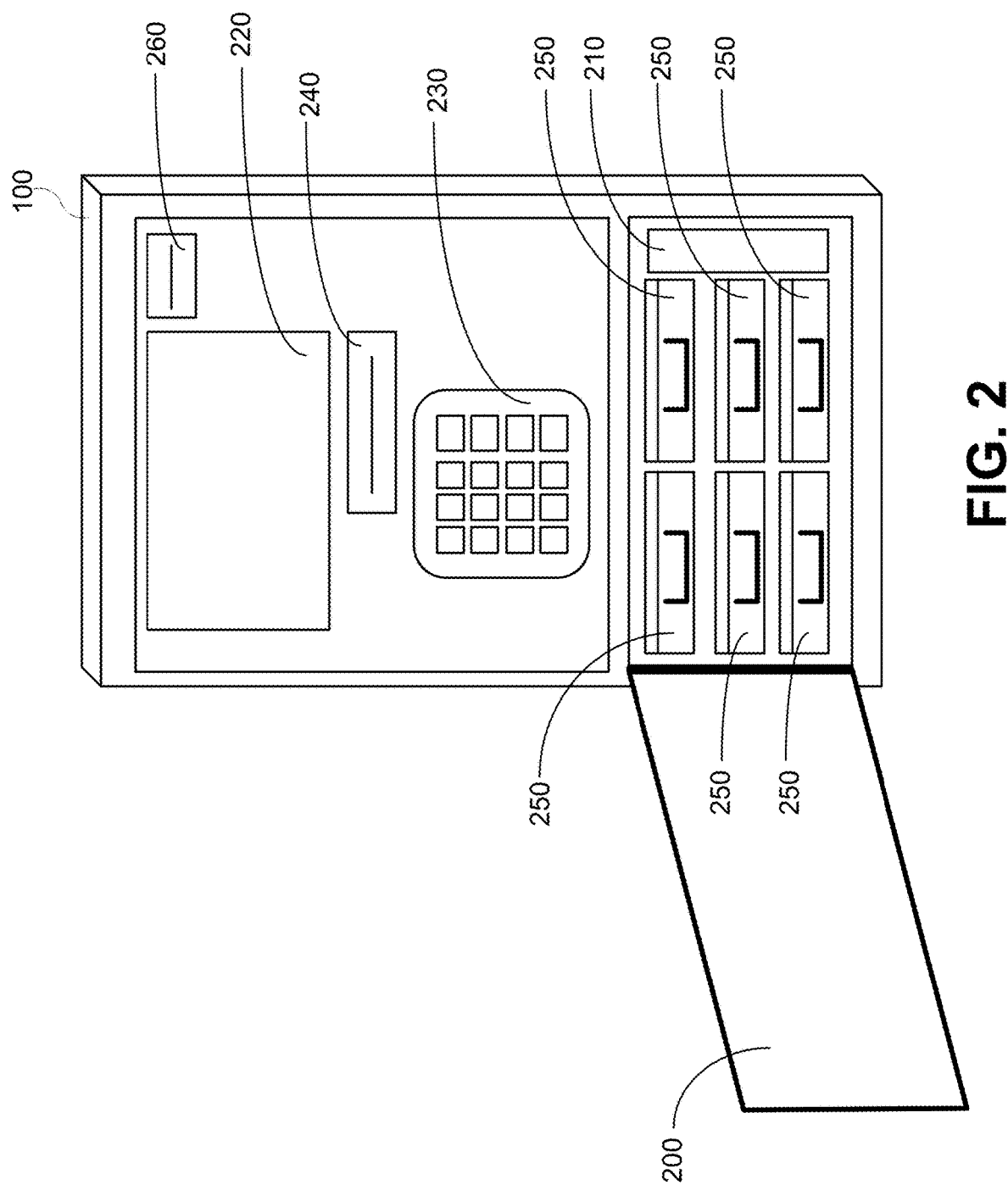
FIG. 2 is a simplified diagram showing components of an example automated teller machine.

FIG. 2 is a simplified diagram showing the automated teller machine 100 with an access panel 200 opened to reveal certain internal components.

As illustrated, the automated teller machine 100 may include a controller 210, a display 220, a keypad 230, an item receiver/dispenser 240, cassettes 250, and a card reader 260.

As further described below, the controller 210 is a computing device. For example, the controller 210 may include a processor that executes instructions retrieved from a computer-readable medium thereby causing the automated teller machine 100 to perform operations for providing access to banking services including handling deposits of value instruments which may then be recycled.

The display 220 may for example, be a liquid-crystal display (LCD), a cathode-ray tube (CRT), or the like. The display 220 is for presenting information such as to a user of the automated teller machine 100. The display 220 may present information under control of the controller 210.

The keypad 230 is an input device allowing input to be provided to the automated teller machine 100. Input received via the keypad 230 may be conveyed to the controller 210. Notably, the keypad 230 may be used by a user to provide a personal identification number (PIN) to the automated teller machine 100 as a part of authenticating to the automated teller machine 100.

The item receiver/dispenser 240 is a mechanical device allowing value instruments to be obtained by and dispensed by the automated teller machine 100. For example, it may be that the item receiver/dispenser 240 provides a single slot through which value instruments are received and dispensed. Additionally or alternatively, the item receiver/dispenser 240 may provide multiple slots such as, for example, one or more slots for receiving value instruments and one or more slots for dispensing value instruments. In some embodiments, the item receiver/dispenser 240 may consist of multiple mechanical units. Each such mechanical unit may be in communication with a respective slot of the automated teller machine 100. Additionally or alternatively, one or more of the mechanical units may communicate with the same slot—i.e., a shared slot. It may be that components or units of the item receiver/dispenser 240 are specialized to a particular type or types of value instrument. For example, a particular component or unit of the item receiver/dispenser 240 may be adapted to receiving and/or dispensing banknotes of one denomination, while another component or unit may be adapted to receiving and/or dispensing banknotes of another denomination. Alternatively, it may be that the item receiver/dispenser 240 is a monolithic unit that handles all manner of value instruments.

The item receiver/dispenser 240 is in communication with the cassettes 250. Each of the cassettes 250 is adapted to receive and/or dispense value instruments. For example, a deposit cassette of the cassettes 250 may be adapted to receive value instruments that are provided for deposit. A deposit cassette may be or may include a bin. In another example, a cash cassette of the cassettes 250 may be loaded with bank notes that can be dispensed to satisfy withdrawals. In another example, there may, as further described below, be provided one or more recycling cassettes of the cassettes 250 that can both receive deposited value instruments and then dispense them in order to satisfy withdrawals. Notably, recycling cassettes may be loaded into the automated teller machine 100 empty or, alternatively, may be loaded into the automated teller machine 100 full or partially full. In a particular example, a recycling cassette may be a cash cassette.

The card reader 260 allows data to be read from a card such as, for example, a common ISO-sized ATM or cheque card. For example, the card reader 260 may allow data to be read from magnetic stripe cards and/or chip cards. In some embodiments, the card reader 260 may require a card to be swiped through it to be read (a so-called "swipe reader") and/or it may allow a card to be inserted into it for reading (a so-called "dip reader"). In some embodiments, the card reader 260 may be adapted to allow inserted cards to be retained by the automated teller machine 100 indefinitely (such as if fraud is suspected) and/or for the period of a session.

Figure 3:
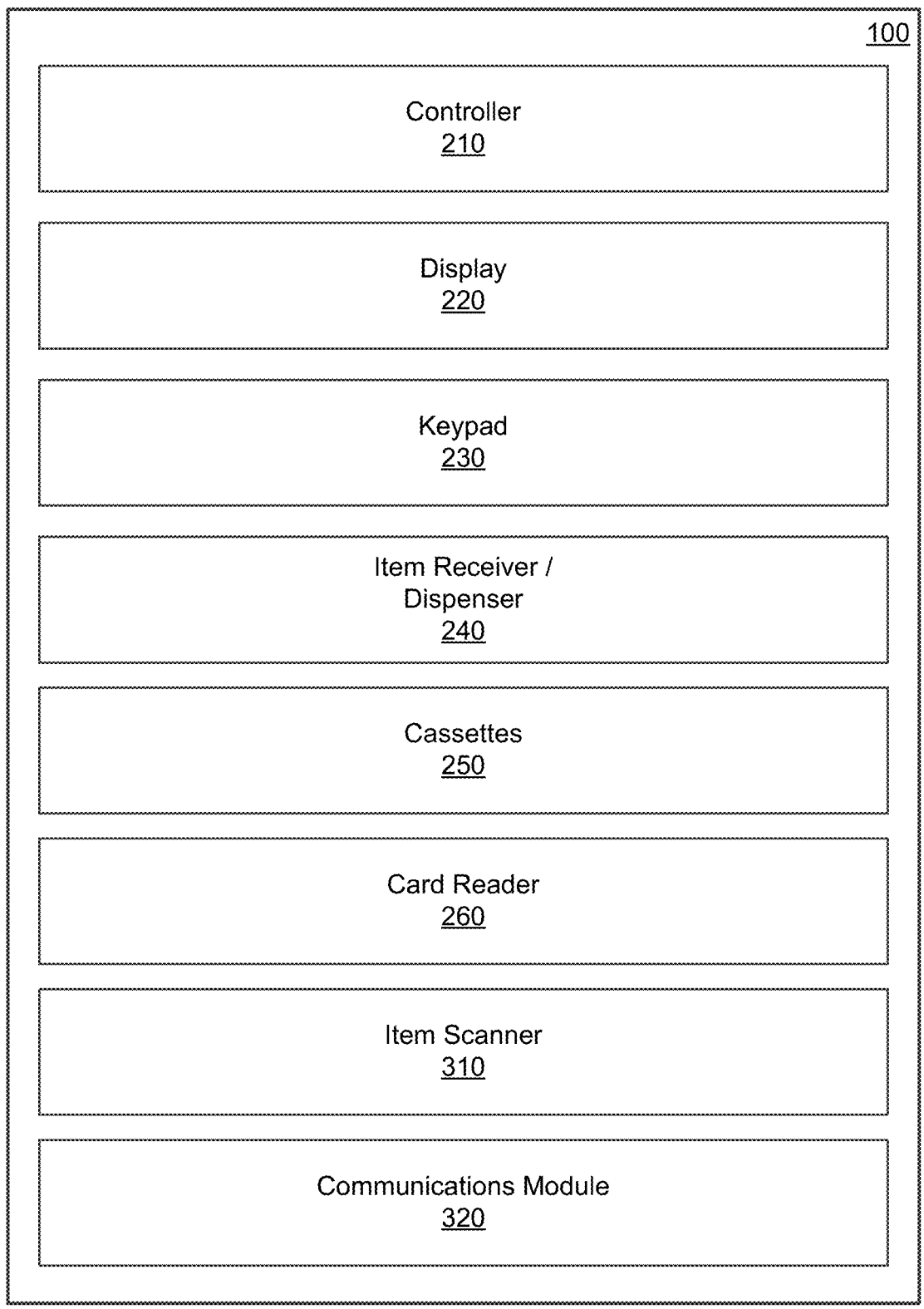
FIG. 3 is a logical block diagram of the example automated teller machine of FIG. 2.

FIG. 3 is a logical block diagram of the automated teller machine 100. As described above, the automated teller machine 100 may include a controller 210, a display 220, a keypad 230, an item receiver/dispenser 240, cassettes 250, and a card reader 260 as described above. Additionally, as shown in FIG. 3, the automated teller machine 100 may include an item scanner 310 and a communications module 320.

The item scanner 310 is adapted to scan some or all of the value instruments received by the automated teller machine 100. For example, the item scanner 310 may scan value instruments (such as, for example, bank notes, negotiable instruments like cheques, money orders, bank drafts, warrants of payment, etc.) as they are received by the automated teller machine 100 such as, for example, by way of the item receiver/dispenser 240. The item scanner 310 may be a colour, black and white, or a greyscale scanner. In some cases, the item scanner 310 may, additionally or alternatively, be an ultraviolet scanner. An ultraviolet scanner may, for example, allow security features of some value instruments to be identified such as, for example, for counterfeit detection. The item scanner 310 may use one or more of a variety of scanning technologies. For example, the item scanner 310 may be or may employ a contact image sensor (CIS), a charge-coupled device (CCD), and/or the like.

The communications module 320 allows the automated teller machine 100 to communicate with other computing devices and/or various communications networks such as, for example, the network 120. In other words, the communications module 320 may allow the automated teller machine 100 to send or receive communications signals. Communications signals may be sent or received according to one or more protocols or according to one or more standards. For example, the communications module 320 may allow the automated teller machine 100 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 320 may allow the automated teller machine 100 to communicate using near-field communication (NFC), via Wi-Fi™, using Bluetooth™ or via some combination of one or more networks or protocols.

Figure 4:
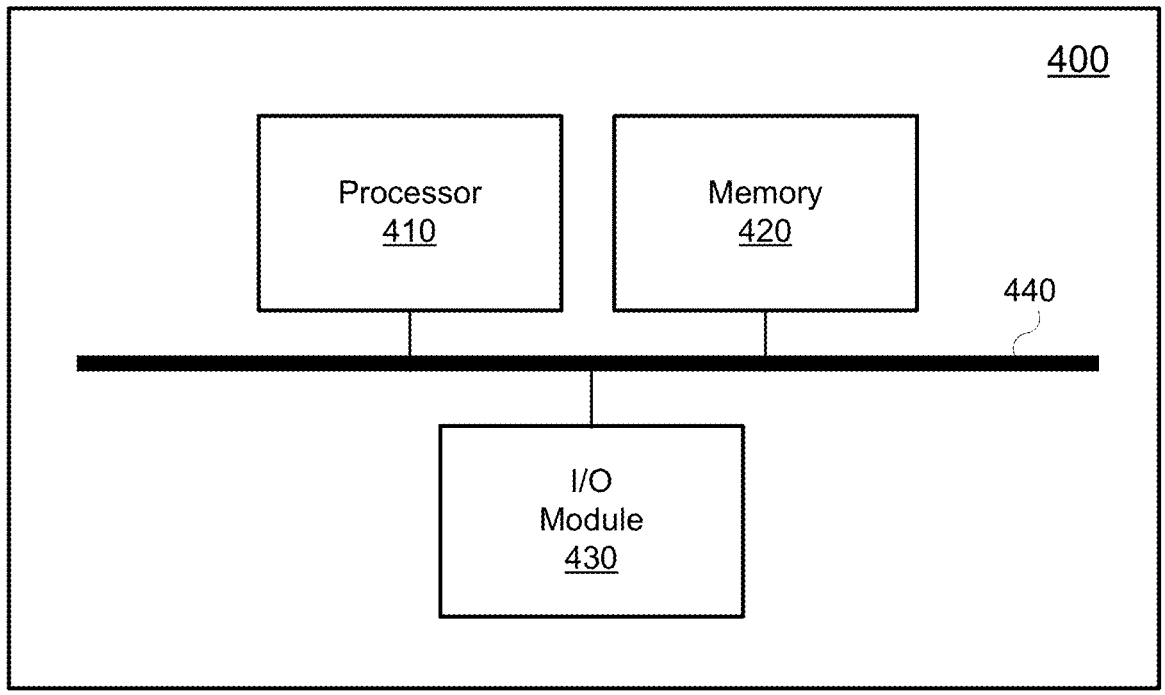
FIG. 4 is a high-level operation diagram of an example computing device.

FIG. 4 is a high-level operation diagram of an example computing device 400. In some embodiments, the example computing device 400 may be exemplary of one or more of the controller 210 (FIG. 2) and the back-office server system 110 (FIG. 1). As will be discussed in greater detail below, each of the automated teller machine 100 (FIG. 1) (and, potentially, the controller 210 in particular) and the back-office server system 110 includes software that adapts it to perform a particular function. More particularly, software of each of the automated teller machine 100 and the back-office server system 110 cooperates, with communication between the automated teller machine 100 and the back-office server system 110 in order to handle deposits of value instruments and to recycle value instruments received by the automated teller machine 100 as a part of such deposits for use in servicing subsequent withdrawals.

The example computing device 400 includes a variety of modules. For example, as illustrated, the example computing device 400 may include a processor 410, a memory 420, and an input/output (I/O) module 430. As illustrated, the foregoing example modules of the example computing device 400 are in communication over a bus 440.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 400.

The I/O module 430 allows the example computing device 400 to interact with devices such as, for example, peripherals to send and receive data. The I/O module 430 may, for example, allow the example computing device 400 to interface with input devices such as, for example, keypads, keyboards, pointing devices, and the like. In another example, the I/O module 430 may, for example, allow the example computing device 400 to interface with output devices such as, for example, displays, printers, and the like.

In a particular example, where the example computing device 400 forms a part of the automated teller machine 100 (FIG. 1) such as, for example, if the example computing device 400 is or forms a part of the controller 210 (FIG. 2) of the automated teller machine 100, the I/O module 430 may allow the example computing device 400 to interface with one or more of the display 220, the keypad 230, the item receiver/dispenser 240, the card reader 260, the item scanner 310, and/or the communications module 320.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
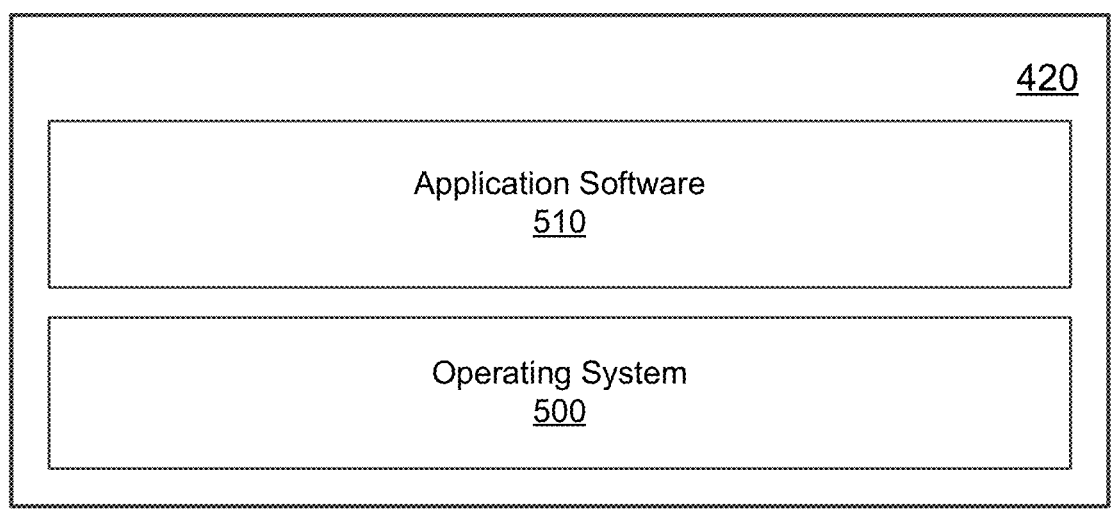
FIG. 5 depicts an example simplified software organization of the example computing device of FIG. 4.

FIG. 5 depicts a simplified organization of software components stored in the memory 420 of the example computing device 400. As illustrated these software components include an operating system 500 and application software 510.

The operating system 500 is software. The operating system 500 allows the application software 510 to access the processor 410, the memory 420, and the I/O module 430. The operating system 500 may be, for example, UNIX™, Linux™, Microsoft™ Windows™, Apple OSX™ or the like.

The application software 510 adapts the example computing device 400, in combination with the operating system 500, to operate as a device performing a particular function. For example, the application software 510 may cooperate with the operating system 500 to adapt a suitable embodiment of the example computing device 400 to operate as the controller 210 (FIG. 2) of the automated teller machine 100 (FIGS. 1, 2 and 3) or as the back-office server system 110 (FIG. 1).

Operations performed by the automated teller machine 100 and the back-office server system 110 will be described below with reference to FIG. 6.

Figure 6:
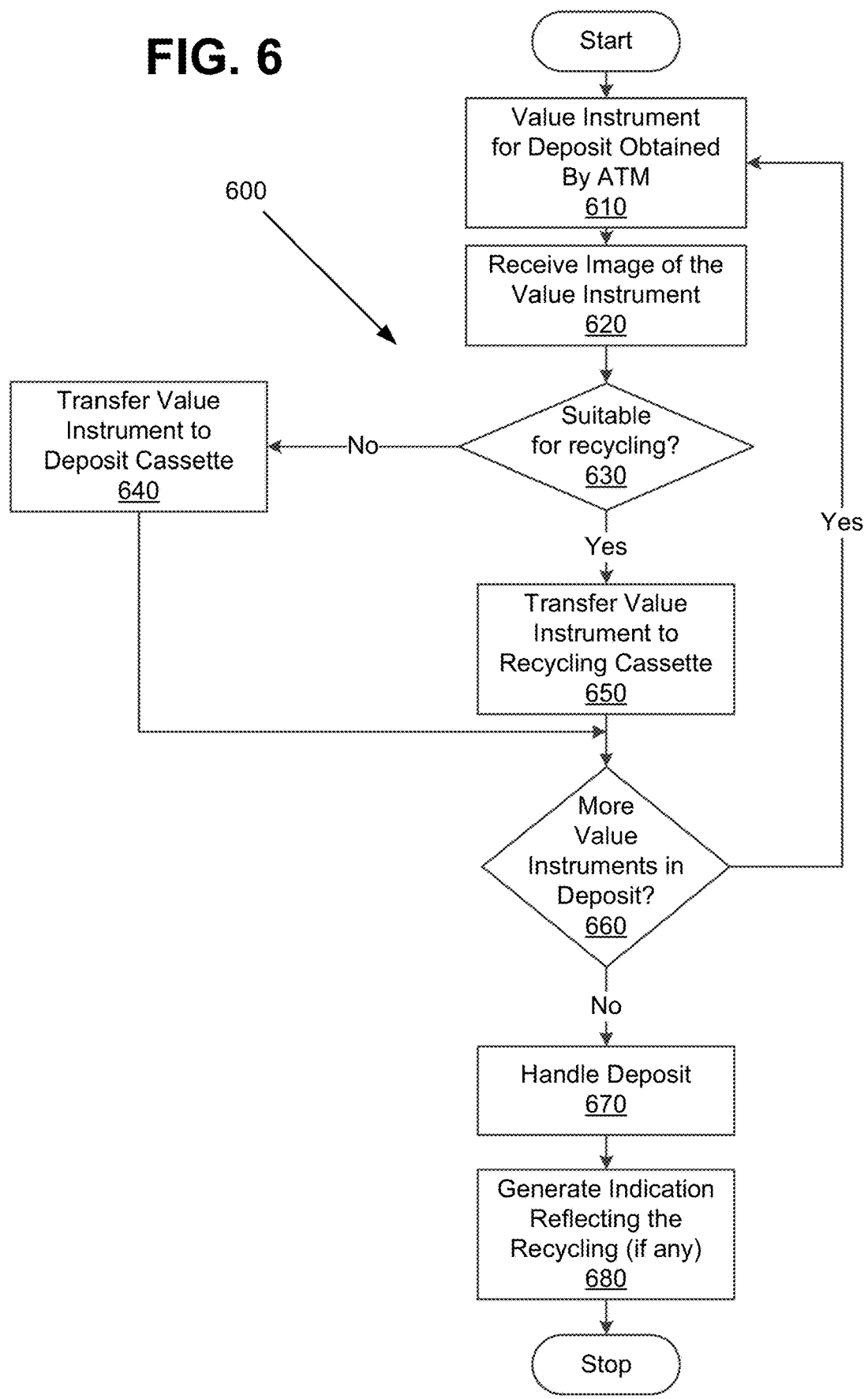
FIG. 6 provides a flowchart depicting example operations performed in automatically handling a deposited value instrument as may be recycled.

FIG. 6 provides a flowchart 600 depicting example operations performed in automatically handling value instruments received for deposit. Operations 610 and onward are performed by one or more processors of one or more computing device, such as, for example, the processor 410 (FIG. 4) of one or more suitably configured instances of the example computing device 400 (FIG. 4), executing software such as, for example, a suitable instance of the application software 510 (FIG. 5). In a particular example, one or more of the operations 610 and onward may be performed by a processor of the controller 210 (FIG. 2) of the automated teller machine 100 and/or a processor of the back-office server system 110.

At the operation 610, a value instrument is obtained by the automated teller machine 100 (FIGS. 1-3) for deposit. The value instrument may, for example, be a banknote. The value instrument may be received by the item receiver/dispenser 240. The value instrument is scanned by the automated teller machine 100 to provide an electronic image (e.g., a bitmap) representing the value instrument. The value instrument may be scanned by the item scanner 310 (FIG. 2).

After scanning, at an operation 620, the image of the value instrument (for example, a scanned image of a received banknote) obtained by the automated teller machine 100 for deposit may be received by the controller 210. Additionally or alternatively, the scanned image of the value instrument, may be transmitted to and received by another computing device such as, for example, the back-office server system 110.

Following the operation 620, at an operation 630, the scanned image of the value instrument is analyzed to determine whether the associated value instrument is suitable for recycling to fulfill withdrawals. For example, it may be determined, based on the condition of the value instrument, whether or not the value instrument is suitable for recycling.

A value instrument may be considered fit for recycling if it meets certain standards of quality or fitness. For example, it may be that the value instrument is required to not be overly mutilated or damaged. In another example, it may be that the value instrument is required not to present any indicia of being a possible counterfeit. Manners of determining whether a value instrument is fit for recycling based on an image of it will now be discussed with reference to the example of a banknote as may correspond to a deposited value instrument.

Figure 7:
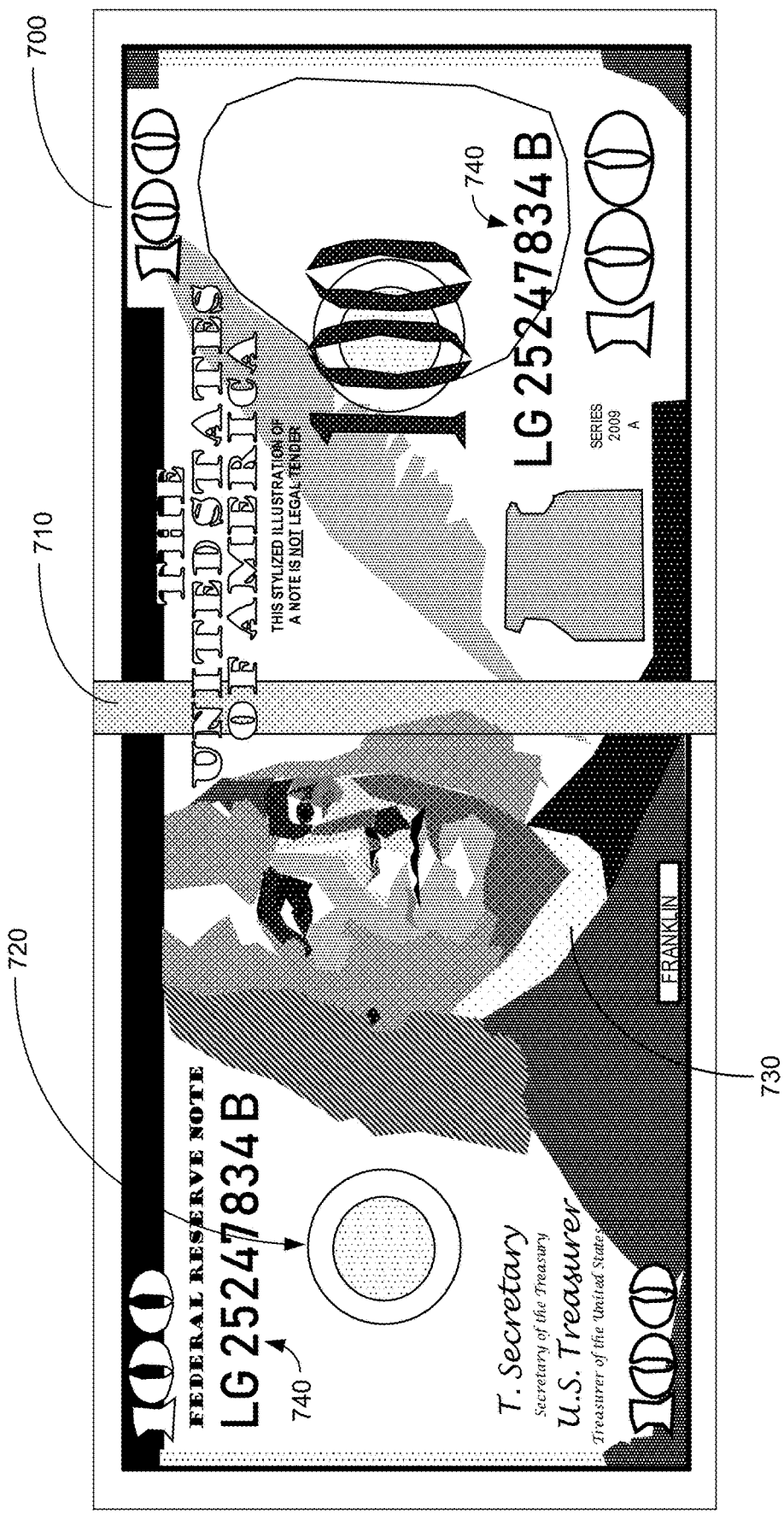
FIG. 7 provides a stylized depiction of a banknote.

FIG. 7 provides a stylized depiction of a banknote 700. It may be that the scanned image of a deposited value instrument corresponds to a banknote such as the banknote 700.

The banknote 700 may, as illustrated, correspond to a United States one hundred dollar ($100) Federal Reserve Note.

The face of the banknote 700 bears an images and numerous visual elements including a security ribbon 710, a seal 720, and a portrait 730, the presence and integrity of which can be verified by visually inspecting a physical banknote. The presence of the pair of serial numbers 740 may also be verified by visual inspection. Corresponding verification and/or additional verification of the banknote 700 may be provided based on an image thereof as further described below.

For example, the condition of the banknote 700 may be verified by comparing such an image of the banknote 700 to a digital specimen value instrument. Such a digital specimen of a value instrument may be or may include, for example, reference images for one or more portions of banknotes of a particular type such as, for example, for the security ribbon 710, the seal 720 and/or the portrait 730. Some minor deviations of the image of the banknote 700 from the digital specimen may correspond to minor problems of condition (e.g., where the banknote 700 is showing effects of wear from circulation). More substantial deviations of the image of the banknote 700 from the digital specimen may correspond to more serious problems of condition (e.g., where the banknote 700 has been mutilated).

It may be that a condition score is determined reflective of the condition of a value instrument such as, for example, a banknote, based on the results of the comparison of one or more banknote features to digital specimen(s). Where a condition score is generated, determining that a value instrument (e.g., the banknote 700) is suitable for recycling to fulfill withdrawals may include determining that such a condition score is greater than a threshold score.

Additionally or alternatively, determining the condition of the banknote 700 may include determining a counterfeit status of the banknote 700. A counterfeit status of the banknote 700 may be determined based on a scanned image of the banknote 700. For example, one or more security features of the banknote 700 as reproduced in an image thereof may be compared to digital specimen(s) so as to verify the security features. Notably, such digital specimen(s) may be the same as, included in, in addition to, or different from the digital specimen(s) as may be employed for assessing bill condition as regards mutilation and/or damage. Based on comparison(s) to digital specimen(s), a counterfeit status of the banknote 700 may be determined. Where a counterfeit status is generated, determining that a value instrument (e.g., the banknote 700) is suitable for recycling to fulfill withdrawals may include determining that such a counterfeit score is less than a threshold score.

Additionally or alternatively, one or more algorithms may be used to verify other elements of the scanned image of the banknote 700 such as, for example, security features such as, for example, a digital watermark hidden (not shown) in the image of the face of the banknote 700 and/or the presence of a EURion constellation (also not shown) in the scanned image.

In another example, beyond verifying the presence of the pair of serial numbers 740, the value of the serial number of the banknote 700 may be extracted and analyzed in one or more ways. The value of the serial number of the banknote 700 may be extracted from the pair of serial numbers 740 by way of, for example, optical character recognition (OCR) techniques. Notably, the serial number of the banknote 700 may be extracted from one or both of the serial numbers of the pair of serial numbers 740. Where the value is extracted from both of the serial numbers of the pair of serial numbers 740, the extracted values may be compared to determine whether they match. Notably, where they do not match the banknote 700 may be considered to be a likely or probable counterfeit and may be considered to be unsuitable for recycling to fulfill withdrawals.

Additionally or alternatively, the extracted value may be analyzed to determine whether it corresponds to an expected format. Notably, again, where the extracted serial number doesn't match an expected format, the banknote 700 may be considered to be a likely or probable counterfeit and may be considered to be unsuitable for recycling to fulfill withdrawals.

Additionally or alternatively, the extracted value may be compared against a database of serial numbers known to be associated with counterfeit bills. Such a database may, for example, include a list of serial numbers of known or suspected counterfeits and/or ranges of values known to be associated with known or suspected counterfeit bills. Notably, again, where there is a match against such a database, the banknote 700 may be considered to be a likely or probable counterfeit and may be considered to be unsuitable for recycling to fulfill withdrawals.

The above description is by way of example but serves to illustrate how, for example, by using analysis of the image of a value instrument obtained by the automated teller machine, it may be determined whether a value instrument is suitable for recycling. Other value instruments may be analyzed in similar manners.

Notably, where the item scanner 310 is or includes an ultraviolet scanner an image of the value instrument may, additionally or alternatively, be obtained of a deposited value instrument under ultraviolet light. Conveniently, in this way, features of a value instrument visible only under ultraviolet light (and/or more apparent under such light) such as, for example, various security features, may be verified based on that image such as, for example, in manners similar to those described above with reference to the banknote 700.

Notably, not all security features of a deposited value instrument will necessarily be checked by the automated teller machine 100. For example, an ATM may not be equipped to check for raised features on the surface of the bill. In another example, the automated teller machine 100 may, additionally or alternatively, not be equipped to verify holograms. For this and other reasons, recycling of value instruments may be integrated with existing fraud systems of a financial institution and some value instruments may not be recycled for reasons other than bill quality. In other words, it may be that beyond inspection of the image of a value instrument, other factors are, additionally or alternatively, considered in determining whether a value instrument is suitable for recycling. For example, it may be that a denomination or value of the value instrument is determined based on the image thereof. It may then be determined, based on previous deposits by a customer associated with the deposit (e.g., the cardholder of a card used to authenticate with the ATM and/or the accountholder of then account into which the deposit is being made) whether a deposit including such a value instrument (e.g., deposits including value instruments of similar denominations or of a similar overall value) is typical for that customer. If such a deposit is typical, then it may be considered that there is a lower likelihood of fraud than if it is atypical. As such, so as to minimize fraud, determining that a value instrument is suitable for recycling to fulfill withdrawals may also be based on whether such a deposit is typical for the customer. In particular, recycling may be foregone for deposits that are sufficiently atypical, while recycling may be favoured for deposits that are sufficiently typical. This may, for example, be determined by assigning, based on one or more factors (e.g., value instrument denomination, overall deposit value, time of deposit, location of deposit etc.), a score or scores related to the "typical-ness" of a deposit for the customer and comparing that score to one or more thresholds. In another example, accounts associated with known or suspected deposits of counterfeit funds may be flagged and recycling may be foregone for deposits to such accounts.

Referring back to FIG. 6, following determination of whether the obtained value instrument is suitable for recycling at the operation 630, if it determined that the value instrument is unsuitable for recycling, an operation 640 is next. By contrast, if it is determined that the value instrument is suitable for recycling, an operation 650 is next.

At the operation 640, retaining of the value instrument by the automated teller machine 100 is initiated. In particular, the automated teller machine 100 may be retained by the automated teller machine 100 for pick-up when the automated teller machine 100 is serviced. For example, the automated teller machine 100 may transfer the value instrument to a deposit cassette of the cassettes 250 such as, for example, by way of the item receiver/dispenser 240.

As noted above, from the operation 630, if it is determined that the value instrument is suitable for recycling, the operation 650 is next.

At the operation 650, the value instrument is transferred to a recycling cassette of the cassettes 250 for use in fulfilling future withdrawals. Conveniently, in this way, the automated teller machine 100 may require less frequent servicing such as, for example, to replenish (e.g., refill) it with value instruments. For example, where the value instrument is a banknote, it may allow deferral of servicing of the automated teller machine 100 to replenish one or more cash cassettes of the cassettes 250.

Following the operation 650, an operation 660 is next. At the operation 660, it is determined whether there are further value instruments in the deposit. For example, it may be that input is received by the automated teller machine 100 indicating whether the deposit is complete. In a particular example, input may be received by way of the keypad 230. Such input may, for example, be received responsive to a prompt displayed, for example, by way of the display 220. Additionally or alternatively, whether there are further value instruments in the deposit may be detected such, as for example, based on whether a further value instrument is received by the item receiver/dispenser 240. For example, it may be determined whether there are further value instruments in the deposit based on a next item being received within a defined timeout period. In a particular example, such a determination made be made based on whether the item receiver/dispenser 240 receives a further value instrument within the defined timeout period.

If it is determined that there are more value instruments in the deposit, control returns back to the operation 610 to receive the next value instrument. Alternatively, if there are no further value instruments in the deposit, an operation 670 is next.

At the operation 670, the deposit is handled. For example, the automated teller machine 100 may handle the deposit consistent with typical handling of deposits by automated teller machines. For example, an account may be credited in the amount of the deposit.

Following handling of the deposit at the operation 670, an operation 680 is next.

At the operation 680, the automated teller machine 100 generates an indication reflecting the recycling (if any). The indication may be sent to a back-end system responsible for management of the automated teller machine 100. For example, it may be sent to the back-office server system 110. In any event, the generation of the indication may serve to influence when a next servicing of the automated teller machine 100 will occur.

Notably, financial institution back-end systems may maintain information about the status of each automated teller machine of that financial institution. Such information may, for example, include what value instruments are available to dispense by a particular ATM such as, for example, the automated teller machine 100. Such information, may, for example, be used for reconciliation. Additionally or alternatively, such information may be used in scheduling servicing of ATMs such as, for example, for replenishment of value instruments (e.g., cash). Notably, however, cash recycling may affect when such servicing (e.g., for replenishment) needs to occur. Accordingly, the state information maintained by such back-end systems should reflect recycling of value instruments so that servicing can be adjusted accordingly. Such systems may, for example, be updated to reflect recycling responsive to input such as, for example, the aforementioned indication reflecting any recycling.

For example, it may be that the indication generated at the operation 680 includes an indication of a level of recycled value instruments retained in the automated teller machine 100. Such an indication (e.g., of the level of recycled value instruments) may be sent by the automated teller machine 100 to an automated scheduling component such as, for example, using the communications module 320. Such an automated scheduling component may be configured to schedule servicing of the automated teller machine 100 based on the level of recycled value instruments. For example, the automated servicing component may be configured to schedule servicing of the automated teller machine 100 by deferring a scheduled service visit where at least a threshold quantity of value instruments have been retained in the automated teller machine 100 for recycling (e.g., where such a level is considered predictive that service on the scheduled service date will not be required such as, for example, to replenish the automated teller machine 100 after it runs out of or low on banknotes and/or banknotes of a particular denomination).

In another example, the automated scheduling component may, additionally or alternatively, be further configured to determine a projected level of value instruments in the automated teller machine 100 based on deposit and withdrawal activity (e.g., recent, typical, and/or historical activity) such as, for example, deposit and withdrawal activity using the automated teller machine 100 and/or similarly situated machines. For example, where the value instruments are banknotes, the projected level of value instruments (i.e., cash in that case) in the automated teller machine 100 may be determined based on cash withdrawal activity using the automated teller machine and cash deposit activity using the automated teller machine. The automated scheduling component may be further configured to schedule servicing of the automated teller machine 100 based on the project level of value instruments (cash or otherwise).

It is noted that the handling and recycling of a given value instrument must be made in real-time or near real-time in order to free up the item receiver/dispenser 240 to handle a next value instrument.

The method and process described above with reference to the flowchart 600 is capable of variation. A non-exhaustive sampling of possible variations will now be provided.

In a first example of possible variations, it may be that whether or not to recycle value instruments is determined on the basis of an entire deposit (e.g., of all of the value instruments making of the deposit) rather than on the basis on of individual value instruments of a deposit. Conveniently, in this way, the condition of each of the various value instruments of a deposit may be considered collectively. In a particular example, if some (or even one) of the value instruments of a deposit show indicia of possible being counterfeit, it may be that the entirety of the deposit is deemed unsuitable for recycling. In some implementations of such a variation, it may be that an interim or holding one of the cassettes 250 is used to hold the value instruments of a deposit, from which those value instruments can later be transferred to a deposit cassette or a recycling cassette following a determination of whether the value instruments of the deposit should recycled (i.e., transferred to the recycling cassette rather than the deposit cassette) following processing and analysis of the deposit as whole. Notably, even if the deposit is assessed as a whole, the handling and recycling of the deposit must be made in real-time or near real-time in order to free up the item receiver/dispenser 240 to a next transaction.

In another example of possible variations, it may be that whether or not a particular value instrument is recycled is based in part on the condition of the automated teller machine 100. For example, it may be that whether a particular value instrument is accepted for recycling is dependent on a fill level of one or more of the cassettes 250 (FIG. 2) of the automated teller machine 100. In a particular example, it may be that where the condition of a particular value instrument is considered poor based on, for example, mutilation, but that value instrument is also not suspected to be a counterfeit, then that value instrument may be transferred for recycling where fill levels are low but may be transferred to a deposit cassette (and not recycled) if fill levels are higher. In particular, where a value instrument is dependent on comparison of a condition score to a threshold, that threshold may be adapted based on a fill level of one or more of the cassettes 250 (FIG. 2) of the automated teller machine 100. Conveniently, in this way, the automated teller machine 100 may adapt its recycling to avoid or defer a running out of value instruments to fulfill withdrawals while also attempting to maximize the quality of recycled deposit items as circumstances permit.

Referring again to FIG. 1, it is restated that the arrangement of FIG. 1 is merely by way of example and, indeed, is capable of variation without deviating from the subject matter of the present application. For example, the back-office server system 110 may include more than one computing device and/or may communicate with other computer servers in order to provide functionality such as, for example, functionality related to or a part of the subject matter of the present application.

Figure 8:
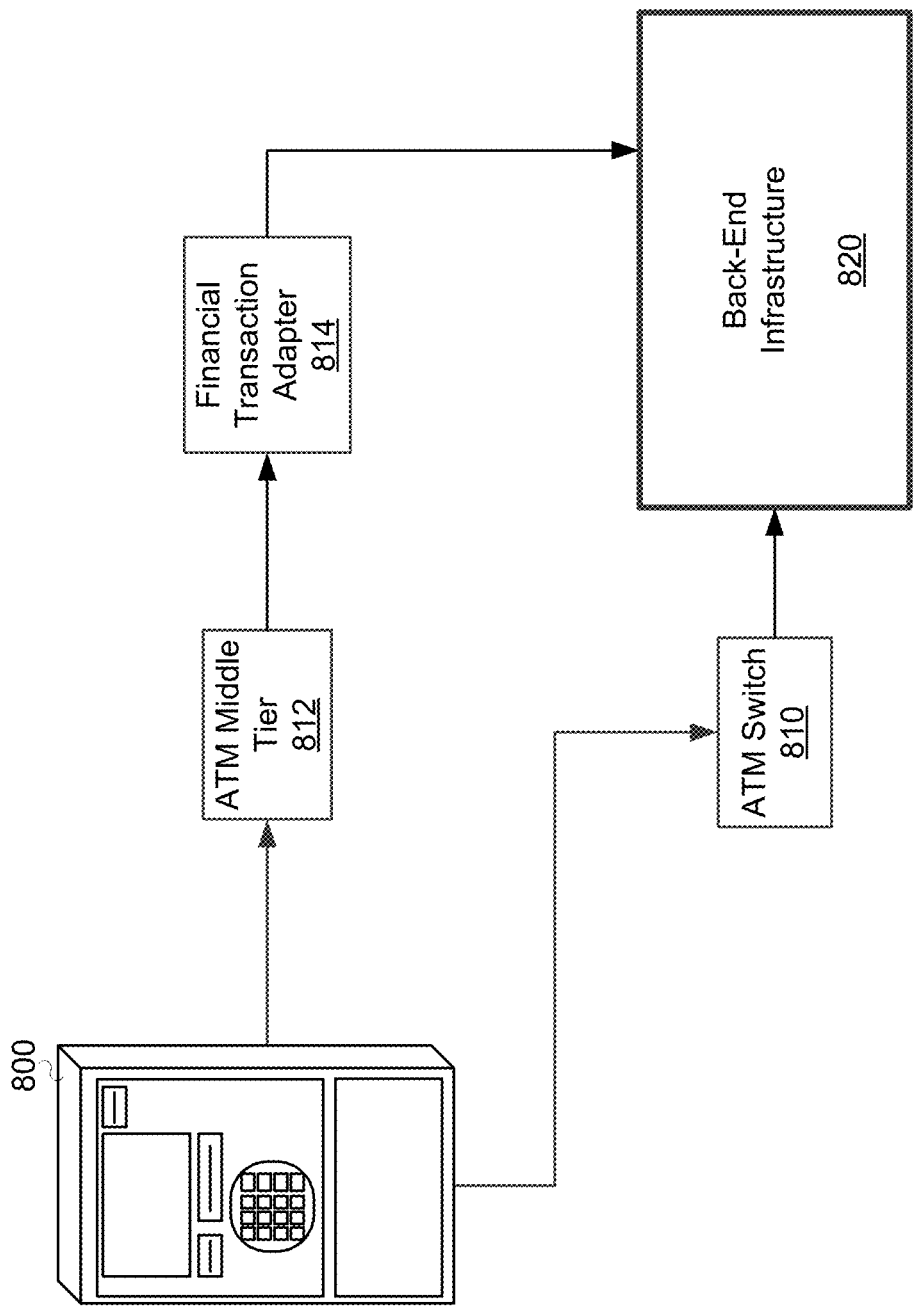
FIG. 8 is a schematic operation diagram illustrating an operating environment of an example embodiment.

FIG. 8 is a schematic operation diagram illustrating an operating environment of another example embodiment.

As illustrated, an automated teller machine 800 is in communication with an ATM switch 810 and an ATM middle tier 812. The ATM switch 810 is in communication with back-end infrastructure 820. The ATM middle tier 812 is in communication with a financial transaction adapter 814. The financial transaction adapter 814 is in communication with the back-end infrastructure 820.

The automated teller machine 800 is an automated teller machine 100 identical or similar to the automated teller machine 100 described above.

The ATM switch 810 and the ATM middle tier 812 are computer systems. For example, one or both of the ATM switch 810 and the ATM middle tier 812 may be a suitably configured instance of the example computing device 400.

The financial transaction adapter 814 and the back-end infrastructure 820 each represent services provided by computer systems. For example, such services may be provided by one or more suitably configured computer systems such as, for example, by one or more suitably configured instances of the example computing device 400.

Figure 9:
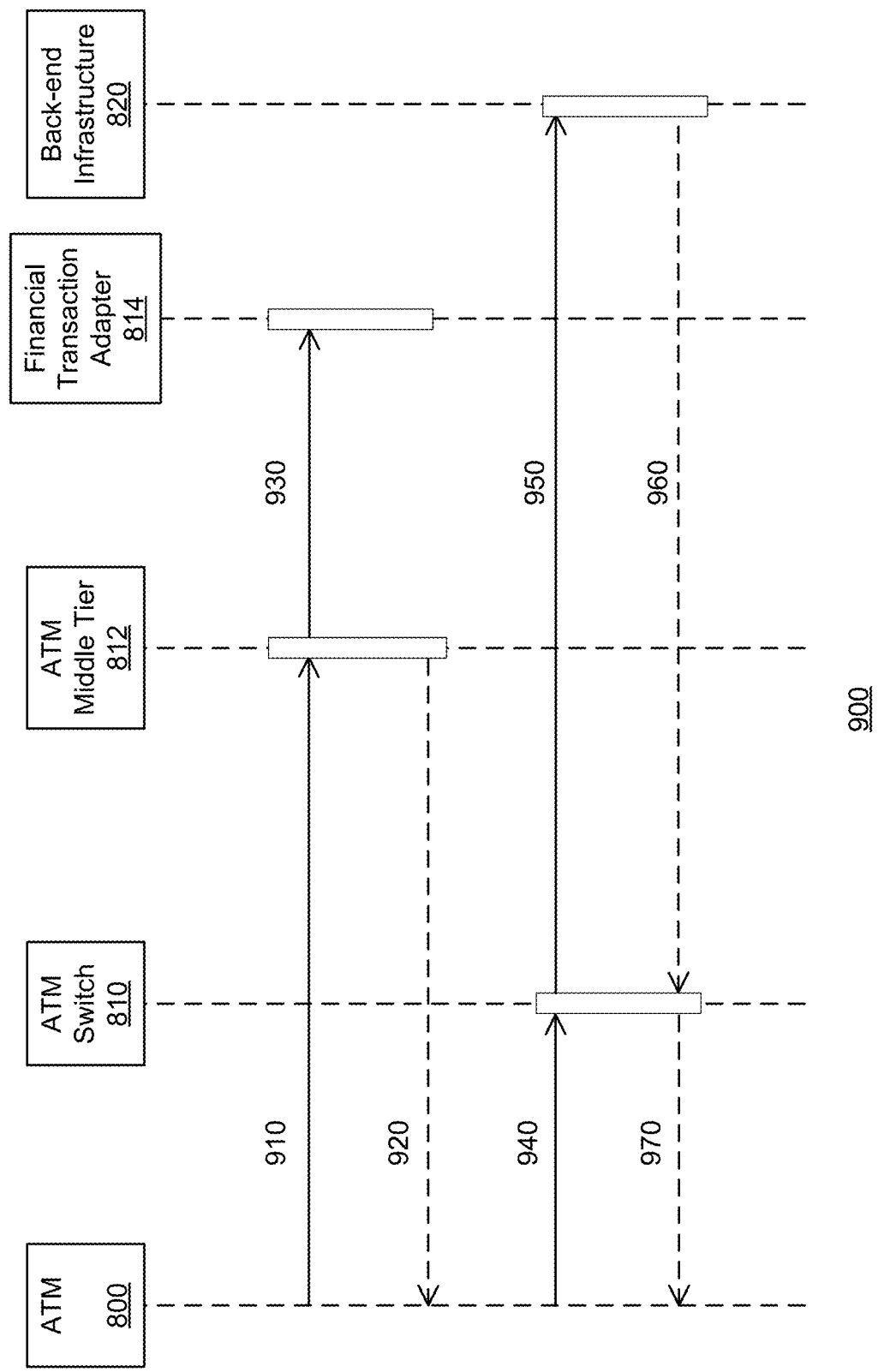
FIG. 9 is a sequence diagram depicting communications between computer systems during handling of a deposit, exemplary of the example embodiment of FIG. 8.

FIG. 9 illustrates a sequence diagram 900, similar to a Unified Modelling Language (UML) sequence diagram, that shows how automated teller machine 800, ATM switch 810, the ATM middle tier 812, the financial transaction adapter 814, and the back-end infrastructure 820 may communicate in some embodiments, and, in particular, depicting messages exchanged therebetween in automatically handling, in real-time or near-real time, deposits of value instruments while also potentially recycling value instruments received by the automated teller machine 800 as the part of such deposits.

In the following description of the sequence diagram 900, discussion is made of various messages being sent and received via a computer network. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that the various message pairs illustrated in FIG. 9—e.g. messages 910 and 920—correspond, respectively, to an RPC or a web service API call and a reply or callback in response to that call.

Notably, the messages illustrated in the sequence diagram 900 may correspond to messages as may be exchanged in the architecture of FIG. 8 in carrying out a process for automatically handling and selectively recycling, in real-time or near-real time, a value instrument received by the automated teller machine 800. Such a method may correspond to the method depicted in the flowchart 600 (FIG. 6) or some variation thereof.

As illustrated, at the beginning of the sequence depicted in the sequence diagram 900, the automated teller machine 800 may send a message 910 to the ATM middle tier 812. Such a message may include information related to a value instrument such as may have been obtained by and scanned at the automated teller machine 800 akin to the operation

610 and the operation 620 (FIG. 6). It may be that the automated teller machine 800 sends the image of the scanned value instrument to the ATM middle tier 812 by way of the message 910. Additionally or alternatively, the automated teller machine may conduct an analysis of the value instrument such as, for example, to determine a condition score. In such embodiments, the message 910 may include the results of such an analysis. In some embodiments, the automated teller machine 800 may perform a partial analysis and may send the results of that partial analysis to the ATM middle tier 812 by way of the message 910. For example, the automated teller machine 800 may extract portions of the value instrument required for counterfeit detection and/or other condition assessment and may send only those portions of the image of the scanned value instrument by way of the message 910.

Next, responsive to the message 910, the ATM middle tier 812 may send a message 920 to the financial transaction adapter 814. In some embodiments, the message 920 may be considered a reply to the message 910. For example, it may be that the ATM middle tier 812 performs operations akin to the operation 630 (FIG. 6), with what operations are performed depending on factors such as, for example, the circumstances and, potentially, on what processing has already been performed by the automated teller machine 800. For example, the ATM middle tier 812 may analyze an image of a value instrument to assess its condition such as, for example, as regards whether it may be mutilated and/or potentially counterfeit. In a particular example, processing at the ATM middle tier 812 may assign one or more scores for condition, etc. as described above. The message 920 may be sent responsive to such processing and may provide information stemming therefrom. In a particular example, the message 920 may provide a counterfeit score, a condition score, and/or information related to or deriving therefrom. Additionally or alternatively, the ATM middle tier 812 may receive one or more such scores or such information from the automated teller machine 800 (e.g., by way of the message 910) and/or may generate such scores based on an analysis and, in either case, may compare them to a threshold score such as may be determined by the ATM middle tier 812 and/or received by the ATM middle tier 812 from another source (e.g., the automated teller machine 800). The message 920 may include the results of such a comparison (e.g., a determination of whether a value instrument should be recycled).

The financial transaction adapter 814 is responsible to act as an intermediary between the ATM middle tier 812 and the back-end infrastructure 820 such as, for example, to convey information related to handling of the value instrument. Further to processing (such as, for example, the processing described above as may occur responsive to the message 910), a message 930 may be sent by the ATM middle tier 812 to the financial transaction adapter 814. The message 930 may include information related to the analysis of the value instrument. For example, the message 930 may include information also included in the message 920 or information based on such information. In a particular example, the message 930 may include information similar to the indication reflecting the recycling (if any) akin to indications as may be generated at the operation 680 (FIG. 6). Notably, such an instance of the message 930 may correspond to intended recycling rather than recycling that has already occurred. Additionally or alternatively, it may be that the message 930 (or another message which is not shown) is sent providing an indication when recycling of one or more value instruments has occurred. For example, it may be that such a message is sent to the financial transaction adapter 814 responsive to a message received by the ATM middle tier 812 that was itself responsive to a message (not shown) from the automated teller machine 800. Responsive to messages such, as for example, messages indicating recycling the financial transaction adapter may, in some embodiments, send one or more further messages (not shown) to the back-end infrastructure 820. For example, such further messages may serve to send one or more indications (e.g., of the level of recycled value instruments) to an automated scheduling component of the back-end infrastructure 820 akin to communication with an automated scheduling component as described above. Conveniently, in this way, when a next servicing of the automated teller machine will occur may be influenced.

Responsive to the message 920, a message 940 is sent by the automated teller machine 800 to the ATM switch 810. The ATM switch 810 is responsible for completing and/or initiating completion of operations of transaction(s) related to handling of the value instrument. For example, the ATM switch 810 may initiate or perform operations related to crediting the payee's account in the amount of the deposit. In a particular example, the ATM switch 810, may initiate a credit to the account into which the deposit including the value instrument is made. In summary, the ATM switch 810 may perform or initiate operations akin to the operation 670 (FIG. 6).

In performing or initiating operations, the ATM switch 810 may communicate with the back-end infrastructure 820. For example, the ATM switch 810 may send a message 950 to the back-end infrastructure 820 and/or may receive a message 960 from the back-end infrastructure 820. In some embodiments, the message 960 may be considered a reply to the message 950. In a particular example, the ATM switch 810 may communicate with the back-end infrastructure 820 such as, for example, to effect a credit corresponding to the deposit.

Upon completing processing and/or initiating processing, the ATM switch 810 may send a message 970 to the automated teller machine 800. In some embodiments, the message 970 may be considered a reply to the message 940. Additionally or alternatively, it may be that the message 970 is sent responsive to the message 960.

The message 970 may act as an indication to the automated teller machine 800 that the payee's account has been credited in the amount of the value instrument.

In some embodiments, the automated teller machine 800 may communicate repeatedly with the ATM middle tier (e.g., similar to the exchange of the message 910 and the message 920) for each value instrument making up a deposit before communicating with the ATM switch 810 to complete the deposit (e.g., similar to the sending of the message 940, etc.).

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a processor; and
   a memory coupled to the processor storing instructions that, when executed by the computer system, cause the computer system to:
   receive an image of a value instrument obtained by an automated teller machine for deposit;
   analyze the image of the value instrument to determine a condition of the value instrument;
   determine, based on the condition of the value instrument, that the value instrument is suitable for recycling to fulfill withdrawals; and
   upon determining that the value instrument is suitable for recycling to fulfill withdrawals, initiate recycling of the value instrument by the automated teller machine and generate an indication reflecting the recycling to influence when a next servicing of the automated teller machine will occur.

2. The system of claim 1, wherein the instructions, when executed by the computer system, further cause the computer system to:
   receive an image of a second value instrument obtained by the automated teller machine for deposit;
   analyze the image of the second value instrument to determine a condition of the second value instrument;
   determine, based on the condition of the second value instrument, that the second value instrument is unsuitable for recycling to fulfill withdrawals; and
   upon determining that the second value instrument is unsuitable for recycling to fulfill withdrawals, initiate retaining of the second value instrument by the automated teller machine for pick-up when the automated teller machine is serviced.

3. The system of claim 1 wherein determining the condition of the value instrument includes:
   determining a condition score reflective of the condition of the value instrument,
   wherein determining that the value instrument is suitable for recycling to fulfill withdrawals includes determining that the condition score is greater than a threshold score.

4. The system of claim 1 wherein analyzing the image of the value instrument to determine the condition of the value instrument includes:
   comparing the image of the value instrument to a digital specimen value instrument.

5. The system of claim 1 wherein the condition includes a counterfeit status of the value instrument and wherein analyzing the image of the value instrument to determine the condition of the value instrument includes:
   verifying, using the image, one or more security features of the value instrument.

6. The system of claim 1 wherein the computer system further comprises a communications module coupled to the processor and wherein the indication reflecting the recycling to influence when a next servicing of the automated teller machine will occur includes an indication of a level of recycled value instruments retained in the automated teller machine and wherein the instructions, when executed by the computer system, further cause the computer system to:
   send the indication of the level of recycled value instruments retained in the automated teller machine to an automated scheduling component using the communications module, wherein the automated scheduling component is configured to schedule servicing of the automated teller machine based on the level of recycled value instruments.

7. The system of claim 6, wherein the automated scheduling component is configured to schedule servicing of the automated teller machine by deferring a scheduled service visit where at least a threshold quantity of value instruments have been retained in the automated teller machine for recycling.

8. The system of claim 7, wherein the automated scheduling component is further configured to determine a projected level of value instruments in the automated teller machine based on cash withdrawal activity using the automated teller machine and cash deposit activity using the automated teller machine and wherein the automated scheduling component is further configured to schedule servicing of the automated teller machine based on the projected level of value instruments in the automated teller machine.

9. The system of claim 1 wherein the instructions, when executed by the computer system, further cause the computer system to:
   determine, based on previous deposits by a customer associated with the deposit, whether deposits including value instruments like the value instrument are typical for the customer, and
   wherein determining that the value instrument is suitable for recycling to fulfill withdrawals is further based on whether the deposit is typical for the customer.

10. The system of claim 1 wherein the value instrument is a banknote.

11. A computer-implemented method comprising:
    receiving an image of a value instrument obtained by an automated teller machine for deposit;
    analyzing the image of the value instrument to determine a condition of the value instrument;
    determining, based on the condition of the value instrument, that the value instrument is suitable for recycling to fulfill withdrawals; and
    upon determining that the value instrument is suitable for recycling to fulfill withdrawals, initiating recycling of the value instrument by the automated teller machine and generating an indication reflecting the recycling to influence when a next servicing of the automated teller machine will occur.

12. The method of claim 11 further comprising:
    receiving an image of a second value instrument obtained by the automated teller machine for deposit;
    analyzing the image of the second value instrument to determine a condition of the second value instrument;
    determining, based on the condition of the second value instrument, that the second value instrument is unsuitable for recycling to fulfill withdrawals; and
    upon determining that the second value instrument is unsuitable for recycling to fulfill withdrawals, initiating retaining of the second value instrument by the automated teller machine for pick-up when the automated teller machine is serviced.

13. The method of claim 11 wherein determining the condition of the value instrument includes:
    determining a condition score reflective of the condition of the value instrument, wherein determining that the value instrument is suitable for recycling to fulfill withdrawals includes determining that the condition score is greater than a threshold score.

14. The method of claim 11 wherein the condition includes a counterfeit status of the value instrument and wherein analyzing the image of the value instrument to determine the condition of the value instrument includes:
verifying, using the image, one or more security features of the value instrument.

15. The method of claim 11 wherein the indication reflecting the recycling to influence when a next servicing of the automated teller machine will occur includes an indication of a level of recycled value instruments retained in the automated teller machine, the method further comprising:
sending the indication of the level of recycled value instruments retained in the automated teller machine to an automated scheduling component, wherein the automated scheduling component is configured to schedule servicing of the automated teller machine based on the level of recycled value instruments.

16. The method of claim 15, wherein the automated scheduling component is configured to schedule servicing of the automated teller machine by deferring a scheduled service visit where at least a threshold quantity of value instruments have been retained in the automated teller machine for recycling.

17. The method of claim 16, wherein the automated scheduling component is further configured to determine a projected level of value instruments in the automated teller machine based on cash withdrawal activity using the automated teller machine and cash deposit activity using the automated teller machine and wherein the automated scheduling component is further configured to schedule servicing of the automated teller machine based on the projected level of value instruments in the automated teller machine.

18. The method of claim 11 further comprising:
determining, based on previous deposits by a customer associated with the deposit, whether deposits including value instruments like the value instrument are typical for the customer, and
wherein determining that the value instrument is suitable for recycling to fulfill withdrawals is further based on whether the deposit is typical for the customer.

19. The method of claim 11 wherein the value instrument is a banknote.

20. A non-transitory computer-readable storage medium storing instructions that when executed by a processor of a computer system cause the computer system to:
receive an image of a value instrument obtained by an automated teller machine for deposit;
analyze the image of the value instrument to determine a condition of the value instrument;
determine, based on the condition of the value instrument, that the value instrument is suitable for recycling to fulfill withdrawals; and
upon determining that the value instrument is suitable for recycling to fulfill withdrawals, initiate recycling of the value instrument by the automated teller machine and generate an indication reflecting the recycling to influence when a next servicing of the automated teller machine will occur.

* * * * *